(12) United States Patent
Pandey

(10) Patent No.: US 12,451,134 B2
(45) Date of Patent: Oct. 21, 2025

(54) VOICE COMMAND AND AUDIO OUTPUT TO OBTAIN BUILT-IN TEST EQUIPMENT DATA

(71) Applicant: Hamilton Sundstrand Corporation, Charlotte, NC (US)

(72) Inventor: Sumit Pandey, Bangalore (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 282 days.

(21) Appl. No.: 18/135,863

(22) Filed: Apr. 18, 2023

(65) Prior Publication Data

US 2023/0343334 A1    Oct. 26, 2023

(30) Foreign Application Priority Data

Apr. 20, 2022   (IN) .............. 202241023256

(51) Int. Cl.
*G10L 15/22*    (2006.01)
*G10L 15/08*    (2006.01)

(52) U.S. Cl.
CPC .............. *G10L 15/22* (2013.01); *G10L 15/08* (2013.01); *G10L 2015/223* (2013.01)

(58) Field of Classification Search
CPC ... G10L 15/22; G10L 15/08; G10L 2015/223; G10L 2015/221; B64F 5/60; G06F 3/167
See application file for complete search history.

(56) References Cited

U.S. PATENT DOCUMENTS

| | | | |
|---|---|---|---|
| 4,943,919 A | 7/1990 | Aslin et al. | |
| 8,291,043 B2 | 10/2012 | Hadley et al. | |
| 8,321,083 B2 | 11/2012 | Beebe et al. | |
| 8,930,068 B1 | 1/2015 | Helder et al. | |
| 9,336,248 B2 | 5/2016 | Li et al. | |
| 9,719,799 B2 | 8/2017 | Pandit et al. | |
| 10,065,750 B2 | 9/2018 | Kathirvel et al. | |

(Continued)

FOREIGN PATENT DOCUMENTS

CN    112752714 A    5/2021

OTHER PUBLICATIONS

Communication pursuant to Article 94(3) EPC dated May 9, 2025 in connection with European Patent Application No. 23168580.1, 5 pages.

(Continued)

*Primary Examiner* — Mark Villena

(57) ABSTRACT

A voice processing system for obtaining data from built-in test equipment of an aircraft which includes an audio device adapted and configured to receive spoken instruction of a user, a voice processor adapted and configured to process the audio input and to translate the audio input into command terms and a memory having a command database programmed with command terms. The memory is adapted and configured to receive translated command terms from audio input, search the command database for translated command terms, map the translated command terms to programmed command terms, and output a command message for retrieval. The system also includes a command processor adapted and configured to receive the command message from the memory and to perform the command by searching stored built-in test equipment failure data in accordance with the command message.

20 Claims, 5 Drawing Sheets

(56) References Cited

U.S. PATENT DOCUMENTS

| | | | |
|---|---|---|---|
| 11,037,573 B2 | 6/2021 | Arantes et al. | |
| 2005/0275558 A1* | 12/2005 | Papadimitriou | G10L 15/22 |
| | | | 704/E15.04 |
| 2009/0281993 A1 | 11/2009 | Hadley et al. | |
| 2010/0030400 A1* | 2/2010 | Komer | G10L 15/26 |
| | | | 704/251 |
| 2011/0125503 A1* | 5/2011 | Dong | G10L 15/22 |
| | | | 704/E15.001 |
| 2016/0229562 A1 | 8/2016 | Kathirvel et al. | |
| 2020/0380970 A1* | 12/2020 | Gauci | B64D 43/00 |
| 2022/0084517 A1 | 3/2022 | Garg et al. | |
| 2022/0335926 A1* | 10/2022 | Saptharishi | G10L 15/183 |
| 2022/0383856 A1* | 12/2022 | Nama | G10L 15/32 |
| 2022/0388630 A1* | 12/2022 | Saptharishi | G08G 5/26 |
| 2023/0215431 A1* | 7/2023 | Baladhandapani | G08G 5/26 |

OTHER PUBLICATIONS

Extended European Search Report issued, dated Aug. 28, 2023, in corresponding European Patent Application No. 23168580.1.

* cited by examiner

VOICE COMMAND AND AUDIO OUTPUT TO OBTAIN BUILT-IN TEST EQUIPMENT DATA

CROSS-REFERENCE TO RELATED APPLICATIONS

This application claims priority to Indian Provisional Patent Application No. 202241023256, filed Apr. 20, 2022, the disclosure of which is incorporated by reference herein in its entirety.

BACKGROUND OF THE INVENTION

The most important part of a passenger's flight experience is to reach their destination safely and on time. During any flight leg, significant amounts of data are being continuously generated and recorded by different aircraft systems for maintenance and review purposes. Among this data are Built in Test Equipment (BITE) generated failures. However, it can take a lot of time and effort for maintenance personnel to analyze and decode the downloaded BITE data. Aircraft systems that often utilize BITE to detect, isolate, record and report any failures during a flight leg can include power distribution, controls and actuation systems, for example. BITE stores any failures and the related data in Non-Volatile Memory (NVM). For each failure, BITE generates and stores a fault record that includes data such as Line-Replaceable Unit (LRU) type, LRU position, Aircraft ID, Flight Leg, Flight Phase, Date, Time, Unique Fault Code, Fault Status, Fault Behavior, Software part number, and the like.

Once a flight leg ends, maintenance personnel download the entire BITE from NVM data on their maintenance laptop to perform maintenance and further review of each failure that gets recorded in the NVM. The data is stored and presented in binary and/or hexadecimal format, and therefore it can take a lot of time for the maintenance personnel to decode and analyze the downloaded data. Moreover, in order to analyze the BITE failure data, maintenance personnel need to read that data from a particular memory location in NVM.

Accordingly, Applicant recognizes that in order to expedite failure analysis and resolution, improved methods and systems for more quickly and simply analyzing failure data are desirable. The devices, systems and related methods of the present invention provide solutions for this need.

SUMMARY OF THE INVENTION

In accordance with one aspect of the invention, a voice processing system for obtaining data from built-in test equipment of an aircraft is provided, which includes an audio device adapted and configured to receive spoken instruction of a user, a voice processor adapted and configured to process the audio input and to translate the audio input into command terms and a memory having a command database programmed with command terms. The memory is adapted and configured to receive translated command terms from audio input, search the command database for translated command terms, map the translated command terms to programmed command terms, and output a command message for retrieval. The system also includes a command processor adapted and configured to receive the command message from the memory and to perform the command by searching stored built-in test equipment failure data in accordance with the command message.

The system can be adapted and configured to receive and process command terms in a plurality of spoken languages, and can be adapted and configured to present command terms to a user visually, audibly or both visually and audibly.

In accordance with another aspect of the invention, a method of retrieving data from built-in test equipment of an aircraft is provided, which includes receiving a voice request from a user by a voice processing system, processing the voice request, sending the processed voice request to a command database, searching the command database for the processed voice request, mapping the processed voice request to programmed command terms, outputting a command message for execution, and presenting results of executed command to the user.

If desired, a user can be prompted to select a spoken language in which to process a voice request. Also, the results of the executed command can be presented visually, audibly or visually and audibly.

In accordance with a still further aspect of the invention, a system for obtaining data from built-in test equipment of an aircraft by voice is provided, which includes one or more processors, and one or more non-transitory computer-readable media maintaining executable instructions, which, when executed by the one or more processors, configure the one or more processors to perform operations comprising: receiving a voice request from a user by a voice processing system, processing the voice request, sending the processed voice request to a command database, searching the command database for the processed voice request, mapping the processed voice request to programmed command terms, outputting a command message for execution, and presenting results of executed command to the user.

BRIEF DESCRIPTION OF THE DRAWINGS

So that those skilled in the art to which the subject disclosure appertains will readily understand how to make and use the devices, systems and methods of the subject disclosure without undue experimentation, embodiments thereof will be described in detail herein below with reference to certain figures, wherein.

DETAILED DESCRIPTION OF THE INVENTION

Figure 1A:
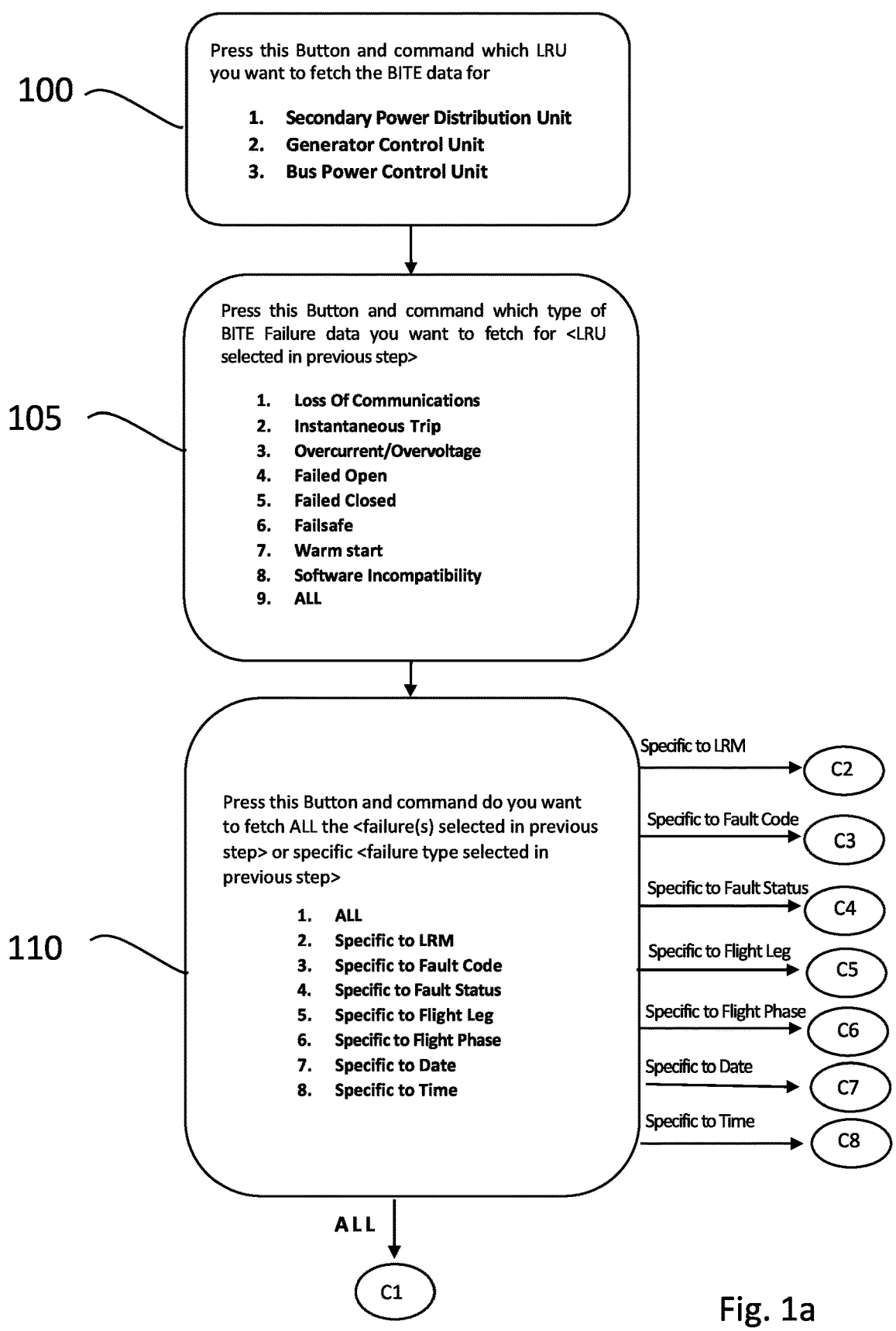
FIGS. 1a-1i are flow charts illustrating voice command logic in accordance with a preferred embodiment of the present invention.

Reference will now be made to the drawings wherein like reference numerals identify similar structural features or aspects of the subject disclosure.

In accordance with the present invention, devices, systems and methods are provided that afford aircraft maintenance personnel the ability to fetch the BITE failures and the data related to those failures through a voice command, in one preferred aspect, in their native language. Such data can be retrieved either on a maintenance computer display or via an audio output. In accordance with one aspect, this computer is portable and brought aboard the aircraft. In accordance with an alternative embodiment, this computer is installed in the aircraft.

Devices, systems and methods in accordance with the invention result in time savings in identifying and fixing failures of any connected systems or LRUs, as data can be gathered quickly through voice commands.

In accordance with the invention, maintenance personnel are provided with a voice command option through a voice processor, so that the maintenance personnel can give voice commands to fetch all the possible BITE failure information for display and/or through an audio output. Commands for BITE failure information can include, but is not limited to: All of the BITE failures in the LRU; Only selected BITE failures in the LRU; All or selected BITE failures on a specific Line-Replaceable Module (LRM) of a LRU; BITE failure data based on different parameters such as getting BITE Fault Code and BITE Fault status for a particular BITE failure;

Date and Time when a particular BITE failure occurred; and STOP—to stop the audio or display during data review, for example.

In accordance with the invention, maintenance personnel are provided the flexibility to command and get the specific BITE data they need. For example. maintenance personnel can issue the following verbal query: "Get ALL the Active Fault Codes for LRM 8 of SPDA LRU when Flight Phase is TAKE OFF, FLIGHT LEG is 45 and Date is Mar. 15, 2020." The devices, systems and methods then parse the spoken language into searchable terms, as illustrated in examples of FIG. 1 and FIG. 2.

With reference now to the Figures, FIGS. 1a-1i are flow charts illustrating voice command logic in accordance with a preferred embodiment of the present invention. Additionally, prompts can be initially be provided to the user to choose a language. Once the voice command is given, the maintenance personnel can choose to receive the data visually on a display, audibly, announced via an audio output, or both visually and audibly. As illustrated, a button push to enable audio response is prompted in order to avoid extraneous noise being interpreted as a command, however this feature is optional, and alternatively such function can be eliminated, or can be achieved in an alternate manner, such as by use of a noise gate during audio processing setting a threshold above typical ambient noise levels before which audio input will be accepted.

At step 100, a selection is made to choose which LRU to obtain BITE data for, for example for secondary power distribution unit, generator control unit, or bus power control unit. At step 105, the type of BITE data is selected, which can be related to, for example, loss of communication, instantaneous trip, overcurrent or overvoltage, failed open, failed closed, failsafe, warm start, software compatibility, or all failure data. Other parameters can be selected at step 110, such as data specific to LRM, specific to fault code, specific fault status, specific flight leg, specific to flight phase, specific to date, specific to time, or all data can be retrieved. The connectors C1-C8 lead to respective steps of FIGS. 1b-1i as illustrated.

Figure 1B:
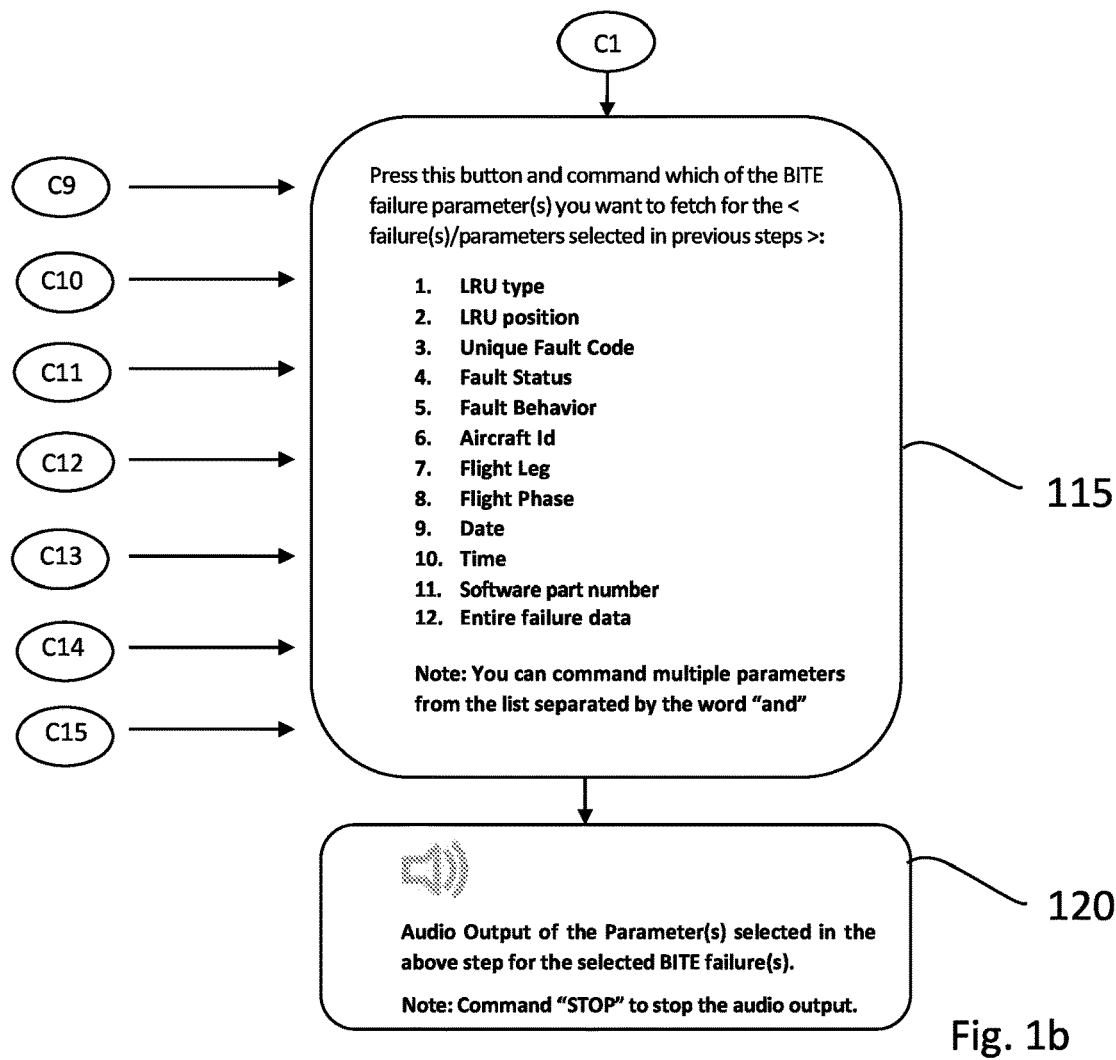

Step 115 of FIG. 1b includes connectors C1 and C9-C15 from respective steps 110, 125, 130, 135, 140, 145, 150 and 155 of FIGS. 1a and 1c-1i. Further parameters are selected at step 115, such as LRU type, LRU position, unique code, fault status, fault behavior, aircraft ID, flight leg, flight phase, date, time, software part number, or alternatively all failure data. In this, and in other steps where applicable, if multiple command parameters are desired, the system in this embodiment is adapted to logically interpret the verbal command "and" as a request for the conjoined search terms. Step 120 outputs the results of the user's search terms.

Figure 1C:
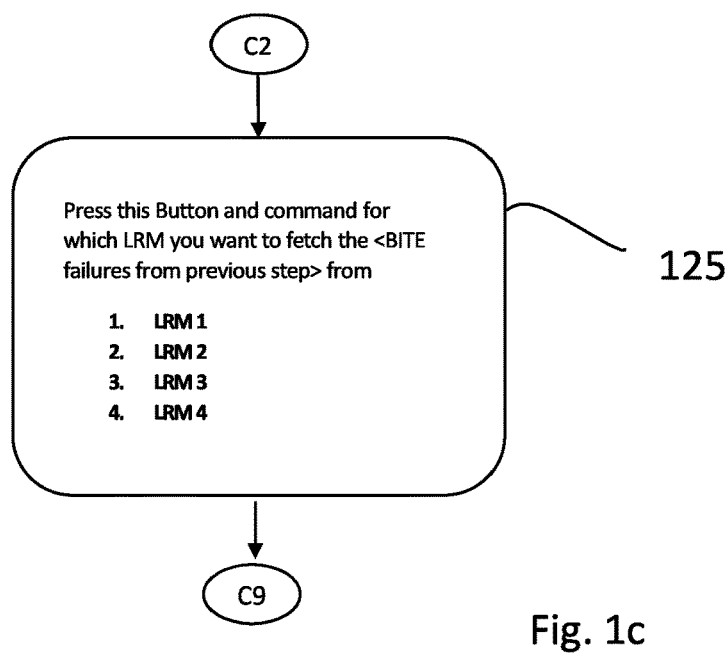
Figures 1D, 1E, 1F:
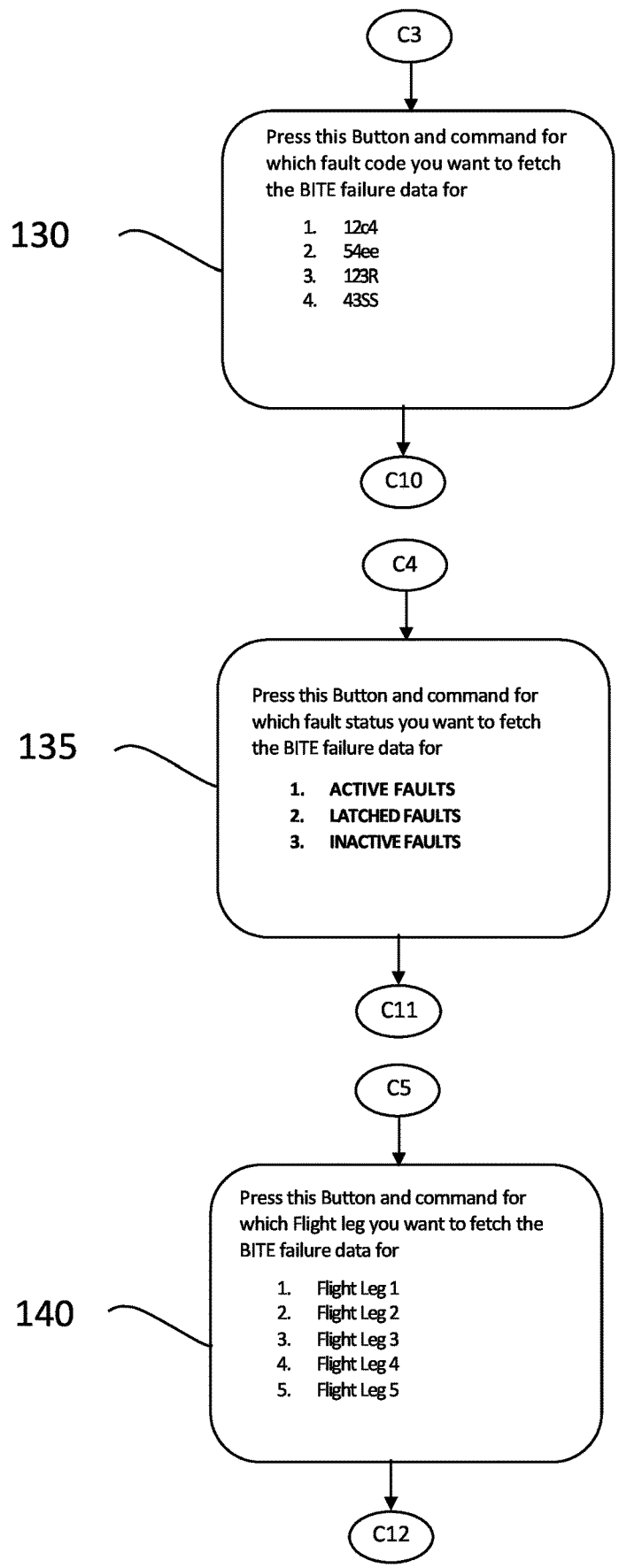
Figure 1G:
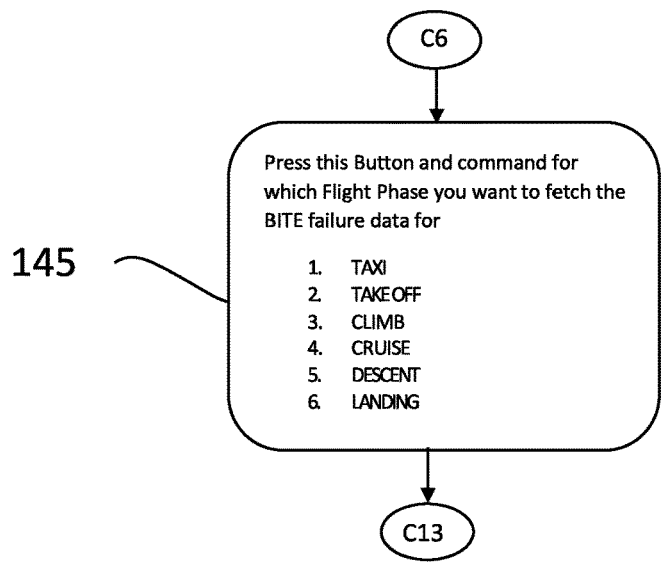
Figure 1H:
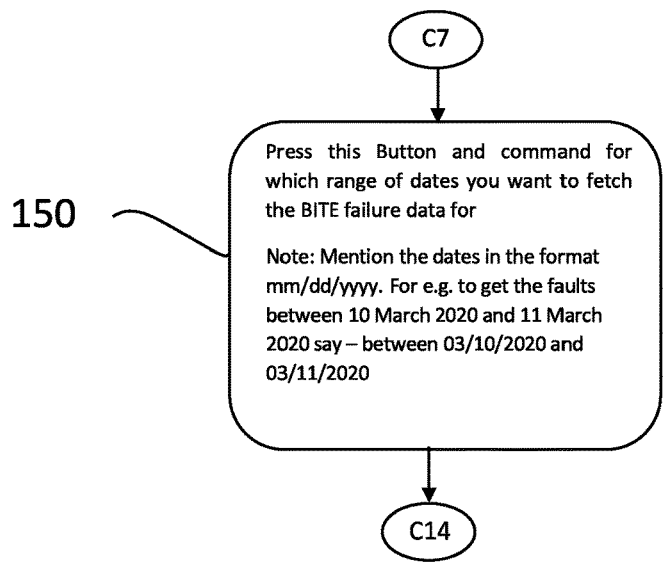
Figure 1I:
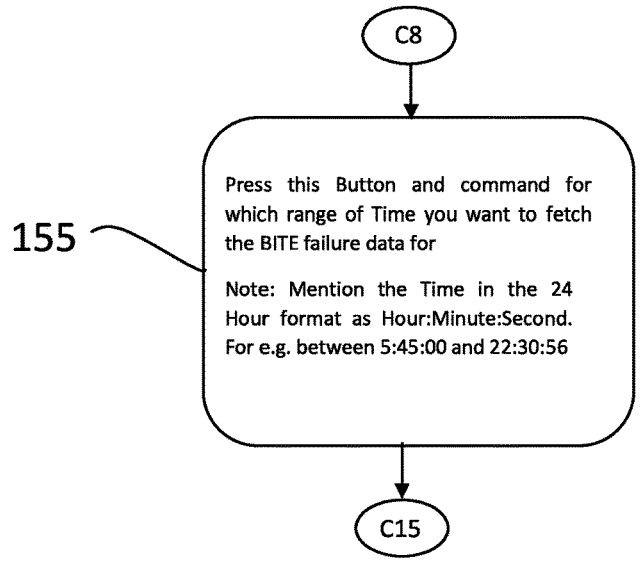

At step 125 of FIG. 1c, from connector C2 of FIG. 1a, a user has a choice of selecting failure data from specific LRMs. At step 130 of FIG. 1d, from connector C3 of FIG. 1a, a user has a choice of selecting failure data relating to specific fault codes. At step 135 of FIG. 1e, from connector C4 of FIG. 1a, a user has a choice of selecting Active faults, latched faults or inactive faults. At step 140 of FIG. 1f, from connector C5 of FIG. 1a, a user has a choice of selecting failure data from different flight legs. At step 145 of FIG. 1g, from connector C6 of FIG. 1a, a user has a choice of selecting failure data from specific flight phases, including taxi, take off, climb, cruise, descent and landing. At step 150 of FIG. 1h, from connector C7 of FIG. 1a, a user has a choice of selecting failure data for a range of calendar dates. At step 155 of FIG. 1i, from connector C8 of FIG. 1a, a user has a choice of selecting failure data for a time range.

Figure 2:
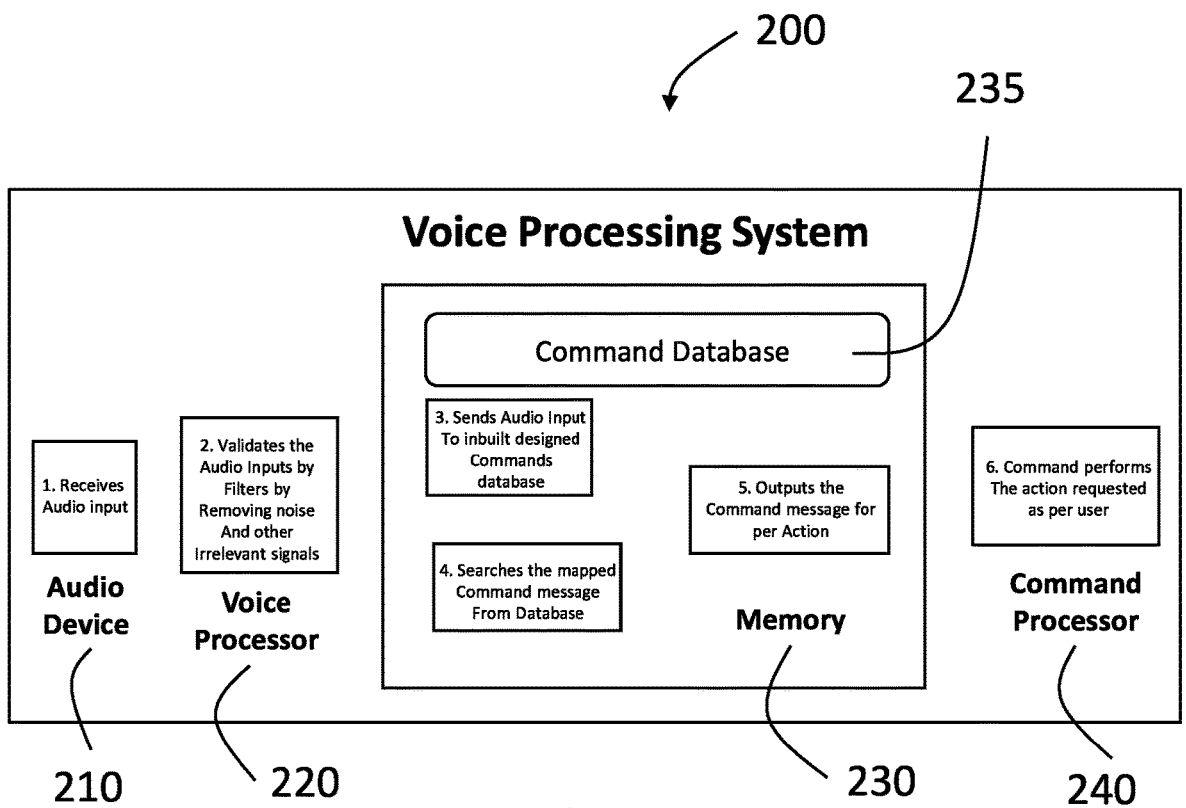
FIG. 2 is a schematic diagram of a voice processing system in accordance with one aspect of the present invention.

With reference to FIG. 2, voice command conversion technology in accordance with the invention is illustrated. In accordance with this example embodiment, a voice processing system 200 includes an audio device 210, voice processor 220, memory 230 and command processor 240. The audio device 210 in the system 200 receives and recognizes the audio input of user. The voice processor 220 validates and filters if necessary the voice input and sends validated input to command database 235 of memory 230. The command database 235 is searched, the audio input is mapped to a command signal corresponding to user input. Then, using the command processor 240, commanded actions are performed in accordance with the maintenance personnel request.

As described herein and as illustrated in the appended drawings, the present invention gives the capability to maintenance personnel to get the BITE data immediately by giving a voice command. Moreover, in accordance with one aspect, the data can be retrieved in any of numerous languages, and therefore the maintenance personnel are able to work efficiently in their native language. Because of the global nature of air travel, devices, systems and methods in accordance with the present invention will be able to help the maintenance personnel around the world, and speed all manner of repairs, benefitting all by decreased testing and repair times. Moreover, there is no additional weight implication for aircraft equipped with the devices, systems and methods of the present invention, as the functionality can be programmed into already-existing hardware.

While the devices, systems and methods of the subject invention have been shown and described with reference to embodiments, those skilled in the art will readily appreciate that changes and/or modifications may be made thereto without departing from the spirit and scope of the invention.

The invention claimed is:

1. A voice processing system for obtaining data from built-in test equipment of an aircraft, the system comprising:
   an audio device configured to receive an audio input including spoken instruction of a user;
   a voice processor configured to process the audio input and to translate the audio input into one or more translated command terms;
   a memory having a command database containing programmed command terms configured to:
      receive the one or more translated command terms from the audio input;
      search the command database for the one or more translated command terms;
      map the one or more translated command terms to one or more of the programmed command terms; and
      output a command message for retrieval, the command message based on the one or more programmed command terms; and a command processor configured to receive the command message from the memory and to perform a command corresponding to the command message by searching stored built-in test equipment failure data in accordance with the command message.

2. The voice processing system of claim 1, wherein the voice processing system is configured to receive and process command terms in a plurality of spoken languages.

3. The voice processing system of claim 1, wherein the voice processing system is configured to present command terms to the user visually.

4. The voice processing system of claim 1, wherein the voice processing system is configured to present command terms to the user audibly.

5. The voice processing system of claim 1, wherein the voice processing system is configured to present command terms to the user visually and audibly.

6. The voice processing system of claim 1, wherein, to search the stored built-in test equipment failure data in accordance with the command message, the command processor is configured to search for failure data in a line-replaceable unit.

7. The voice processing system of claim 1, wherein, to search the stored built-in test equipment failure data in accordance with the command message, the command processor is configured to search for a fault code or a fault status for a particular failure.

8. The voice processing system of claim 1, wherein, to search the stored built-in test equipment failure data in accordance with the command message, the command processor is configured to search for a date and time of occurrence of a particular failure.

9. The voice processing system of claim 1, wherein the command processor is configured to access the stored built-in test equipment failure data in a non-volatile memory of the aircraft.

10. A method of retrieving data from built-in test equipment of an aircraft, the method comprising:
receiving a voice request from a user by a voice processing system;
processing the voice request;
sending the processed voice request to a command database;
searching the command database for the processed voice request;
mapping the processed voice request to one or more programmed command terms;
outputting a command message for execution, the command message based on the one or more programmed command terms;
performing a command corresponding to the command message by searching stored built-in test equipment failure data in accordance with the command message; and
presenting one or more results of the execution of the command message to the user.

11. The method of claim 10, further comprising:
prompting the user to select a spoken language in which to process the voice request.

12. The method of claim 10, wherein the one or more results of the execution of the command message are presented visually.

13. The method of claim 10, wherein the one or more results of the execution of the command message are presented audibly.

14. The method of claim 10, wherein the one or more results of the execution of the command message are presented visually and audibly.

15. The method of claim 10, wherein searching the stored built-in test equipment failure data in accordance with the command message comprises searching for failure data in a line-replaceable unit.

16. The method of claim 10, wherein searching the stored built-in test equipment failure data in accordance with the command message comprises searching for a fault code or a fault status for a particular failure.

17. The method of claim 10, wherein searching the stored built-in test equipment failure data in accordance with the command message comprises searching for a date and time of occurrence of a particular failure.

18. The method of claim 10, wherein searching the stored built-in test equipment failure data in accordance with the command message comprises accessing the stored built-in test equipment failure data in a non-volatile memory of the aircraft.

19. A system for obtaining data from built-in test equipment of an aircraft by voice, the system comprising:
one or more processors; and
one or more non-transitory computer-readable media containing executable instructions that, when executed by the one or more processors, cause the one or more processors to:
receive a voice request from a user;
process the voice request;
send the processed voice request to a command database;
search the command database for the processed voice request;
map the processed voice request to one or more programmed command terms;
output a command message for execution, the command message based on the one or more programmed command terms;
perform a command corresponding to the command message by searching stored built-in test equipment failure data in accordance with the command message; and
present one or more results of the execution of the command message to the user.

20. The system of claim 19, wherein the stored built-in test equipment failure data is contained in a non-volatile memory of the aircraft.

* * * * *